United States Patent [19]

Morgan et al.

[11] Patent Number: 4,745,597
[45] Date of Patent: May 17, 1988

[54] RECONFIGURABLE LOCAL AREA NETWORK

[76] Inventors: Doug Morgan; Phil Landmeier, both of P.O. Box 18888, Irvine, Calif. 92713

[21] Appl. No.: 863,086
[22] Filed: May 14, 1986
[51] Int. Cl.$^4$ .............................................. H04J 3/08
[52] U.S. Cl. ...................................... 370/87; 370/85; 370/15
[58] Field of Search .................... 370/85, 87, 15, 89; 379/5; 340/825.5, 825.05

[56] References Cited

U.S. PATENT DOCUMENTS

| | | | |
|---|---|---|---|
| 4,460,994 | 7/1984 | Scanlon et al. | 370/89 |
| 4,530,085 | 7/1985 | Hamada et al. | 370/15 |
| 4,611,324 | 9/1986 | Giacometti et al. | 370/15 |

Primary Examiner—Douglas W. Olms
Assistant Examiner—James E. Busch
Attorney, Agent, or Firm—Blakely, Sokoloff, Taylor & Zafman

[57] ABSTRACT

Local area networks having a high level of network integrity, error detection and correction, message security, expandability and flexibility are disclosed. The system is comprised of a loop controller which may communicate with a host through a standard interface such as an RS232 interface, and to which a plurality of nodes are coupled in a reconfigurable network. Each node has a plurality of modes controlled by the network controller to serve various functions depending upon requests from the controller and/or the needs or condition of the respective node from time to time. In particular, the first node is coupled to the controller through a pair of wires, with each successive node being coupled to the preceding node through a similar pair of wires. In one mode, the respective node monitors the incoming signal from the controller as repeated through any preceding nodes, and itself acts as a signal repeater for the next downstream node. The node also acts as a signal repeater to any return signal from the downstream node to pass that signal on toward the loop controller. In another mode the respective node provides its own signal on the return line for transmission toward the controller, and at the same time monitors the incoming return signal received from the next downstream node for repeating that signal on the upstream return line as soon as it completes its own transmission. In still another mode, the incoming signal is not repeated for the next node downstream but rather is looped back toward the controller.

33 Claims, 6 Drawing Sheets

REDUNDANT DOUBLE LOOP NODE FAILURE

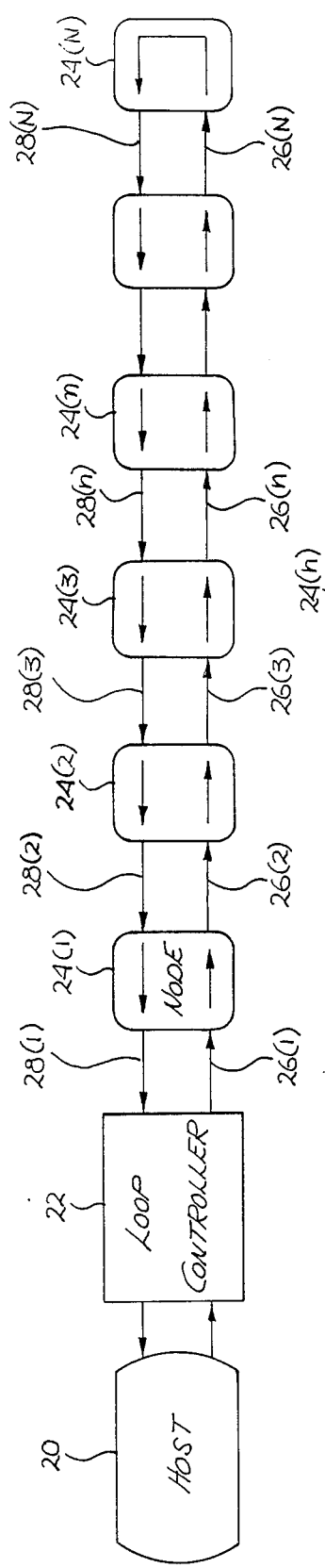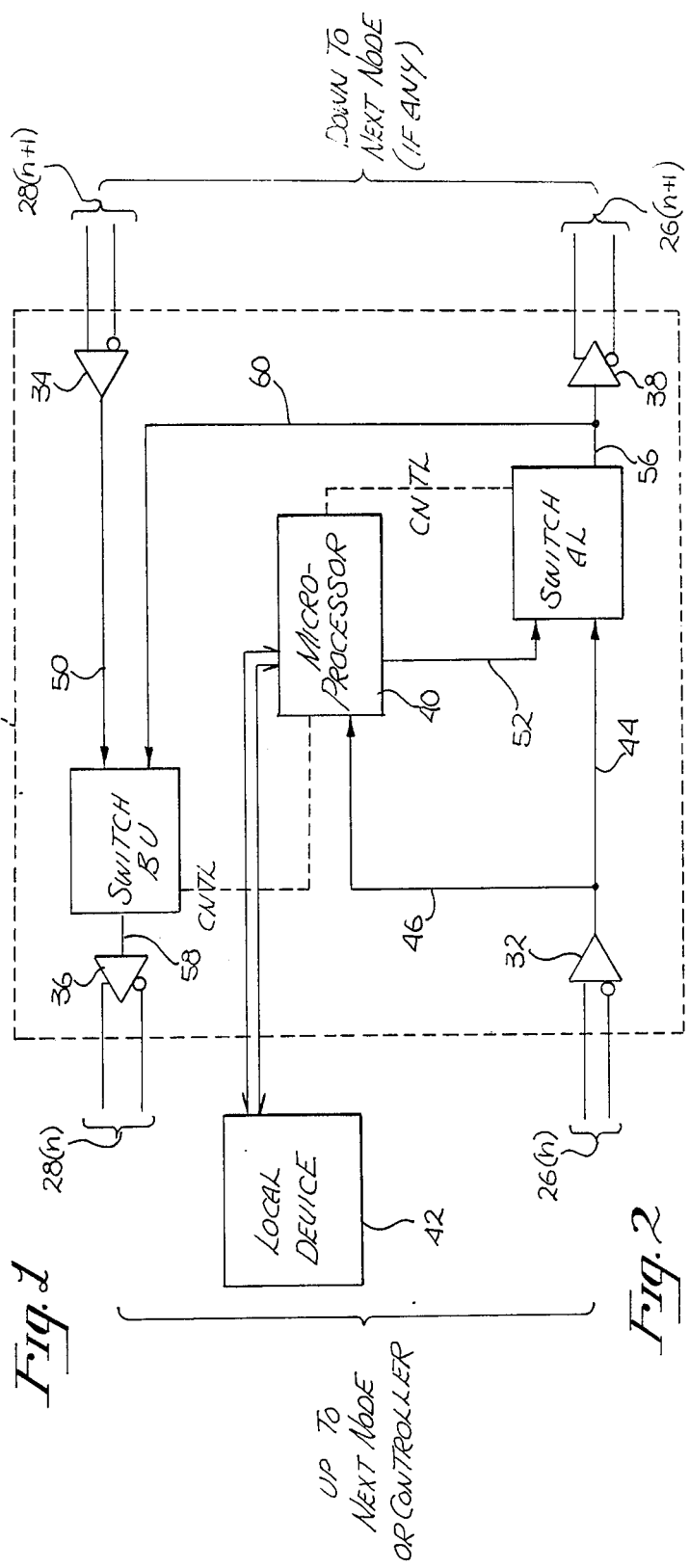

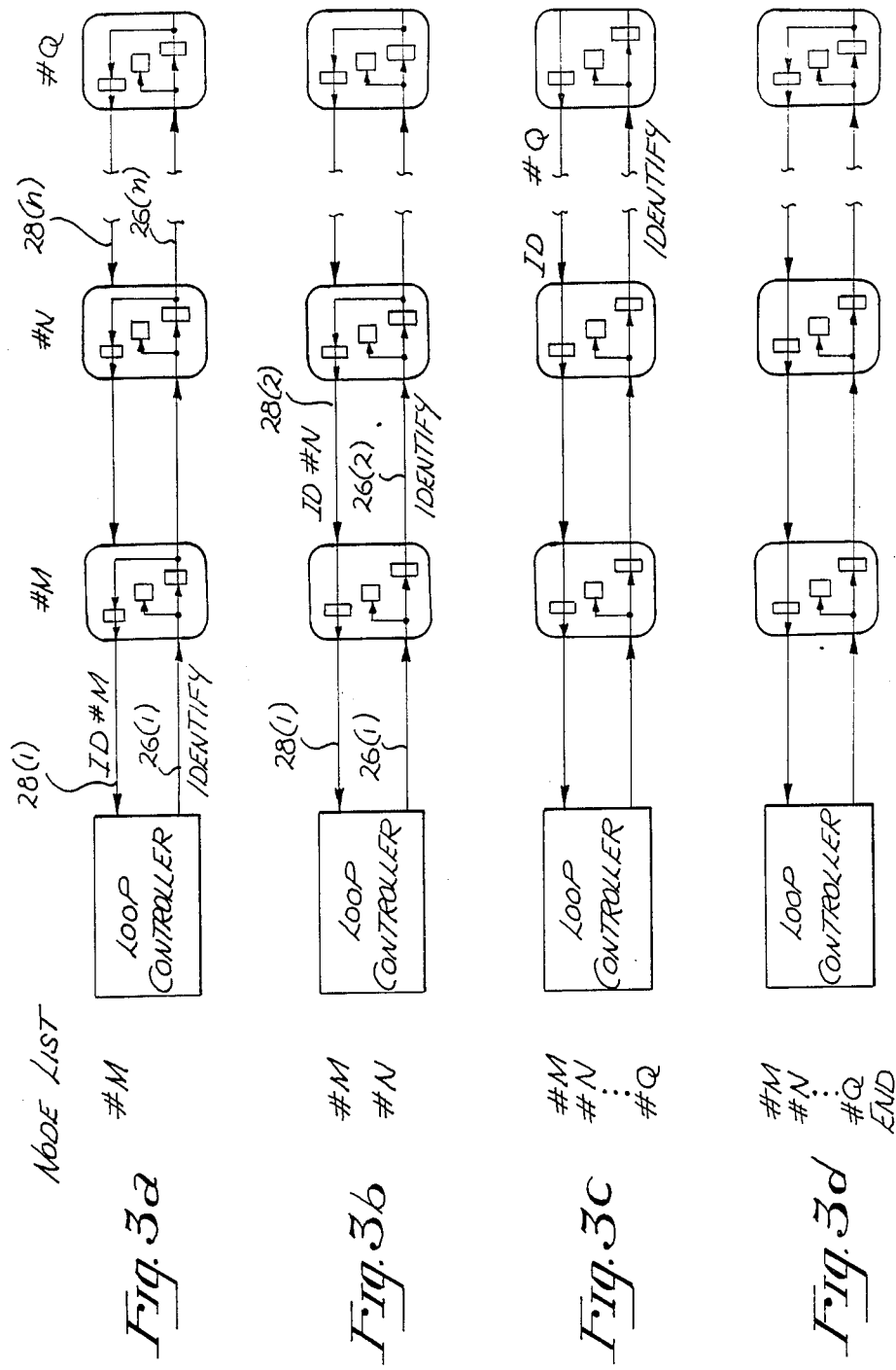

REDUNDANT DOUBLE LOOP TRANSMISSION LINE FAILURE

REDUNDANT DOUBLE LOOP NODE FAILURE

RECONFIGURABLE LOCAL AREA NETWORK

BACKGROUND OF THE INVENTION

1. Field of the Invention.

The present invention relates to the field of communication networks.

2. Prior Art.

In many current applications it is desired to have a plurality of devices connected in some form of network to allow digital communication to and from the various digital devices so connected. In general in such networks communication is in digital form, with the messages sent and received comprising various types of information depending upon the nature of the network and of the devices coupled to the network. By way of example, the information being communicated may be data, commands to control the actions of various devices, monitoring signals, acknowledgement signals, etc. For this purpose various types of basic networks are known, though each type in general has many variations, either enhancing the basic network or tailoring the network to specific applications or both. By way of example, some networks allow any device coupled to the network to seize control of the network under certain conditions, during which time the seizing device can communicate with any other device on the network. Such a scheme has the advantage of allowing device to device communications, though has certain complication in hardware to resolve network contention problems, determine priority, provide for expansion capabilities, etc. Other networks frequently use some form of central controller to control the network whereby the individual devices or nodes of the network may be of a simpler configuration because of the lack of need therein for the ability to seize and control the network. It is this general type of network to which the present invention is primarily directed.

In addition to the foregoing, there are various techniques which may be utilized to handle communication from the controller to the nodes and from the nodes back to the controller. By way of example, in a multidrop system, each node monitors a line and recognizes that when a specific request is made of that node, it will respond in accordance with that request. The advantage of the multidrop connection of course is that communication to all nodes is very fast, as all nodes are monitoring the same line at the same time. However, such a system has certain limitations in that while a specific node may quickly respond to a request addressed thereto, severe bus contention and priority problems arise if the use of a generalized pole is contemplated, whereby more than one node need respond at substantially the same time. Accordingly, such systems, to remain relatively inexpensive, must utilize individualized polling of nodes to avoid these problems.

In the case of a daisy chain connection, each node in a daisy chain's string of nodes will monitor an incoming request and if not for that node, will pass the request on down to the next node. Such a system has the advantage that line contention problems are avoided and priorities are set by the order in which the nodes are coupled in the daisy chain. However, such systems tend to be slow for various reasons and accordingly, are not suitable for use as high speed networks. Finally, some networks use time slotting wherein different nodes may communicate in different time slots. Again, line contention problems are alleviated, though the assignment of time slots to nonresponding nodes becomes an inefficient use of the potential communication rate of the system.

Reissue Pat. No. 28958 discloses a communication loop system having a bidirectional transmission capability between terminals utilizing a loop controller. The system includes switching units between some nodes which allow isolation of a loop segment and the establishment of an operable folded loop for the remaining nonisolated loop portions of the system. The system features devices for enabling synchronous switchover operation during reconfiguration of the loop, which synchronous switchover insures that no data stream interruption or disturbance occurs for the units or terminals not attached to the disconnected loop segment. To achieve this however, each switching unit requires two delay means and a discriminator so that one of two data streams may be delayed for synchronization before full system switch be achieved.

In U.S. Pat. No. 3,716,834, a system for use with a data transmission network having a central station and a plurality of remote stations connected in series by a low grade transmission line such as a telephone pair is disclosed. The system is immune to common transmission line faults and is also capable of identifying a transmission line fault when it occurs, the nature of the fault and the approximate location of the fault in the network. In U.S. Pat. No. 3,601,806, digital signals are bidirectionally transmitted between a master station and a plurality of remote stations on a single wire. Each station is successively interrogated by means of clock pulses transmitted from the master station, data being transmitted from the master station to the remote station on certain predetermined digital bits established by the clock pulses, and data being transmitted from the remote station to the master station on certain other predetermined bits. When the predetermined bit count for each remote station has been completed, this station is deactivated and clock and data pulses are bypassed through the station in either direction to provide communication between the master station and another remote station. This interrogation and bidirectional transmission of data is repeated successively for each remote station until all in turn have been interrogated or polled.

BRIEF SUMMARY OF THE INVENTION

Local area networks having a high level of network integrity, error detection and correction, message security, expandability and flexibility are disclosed. The system is comprised of a loop controller which may communicate with a host through a standard interface such as an RS232 interface, and to which a plurality of nodes are coupled in a reconfigurable network. Each node has a plurality of modes controlled by the network controller to serve various functions depending upon requests from the controller and/or the needs or condition of the respective node from time to time. In particular, the first node is coupled to the controller through a pair of lines, one for outgoing signals and one for return signals, with each successive node being coupled to the preceding node through a similar pair of lines. In one mode, the respective node monitors the incoming signal from the controller as repeated through any preceding nodes, and itself acts as a signal repeater for the next downstream node. The node also acts as a signal repeater to any return signal from the down-stream node to pass that signal on toward the loop controller on a return line. In another mode, the incoming signal is not repeated for the next node downstream but rather is looped back toward the controller on the return line to effectively terminate the operative node string at that position. In another mode the respective node provides its own signal on the outgoing line for transmission toward the last operative node in the loop, wherein it is looped back to the return line for transmission toward the controller, and at the same time monitors the incoming signal received from the next upstream node for repeating that signal on the outgoing line as soon as it completes its own transmission. Various embodiments, features, methods of operation and capabilities of the invention are disclosed, including various levels of redundancy, fault detection and fault tolerance.

BRIEF DESCRIPTION OF THE DRAWINGS

FIG. 1 is a block diagram of a network of one embodiment of the present invention.

FIG. 2 is a schematic diagram of a typical node used in the network of FIG. 1.

FIGS. 3a through 3d are block diagrams illustrating the start up sequence for the system of FIG. 1.

DETAILED DESCRIPTION OF THE INVENTION

Figure 4:
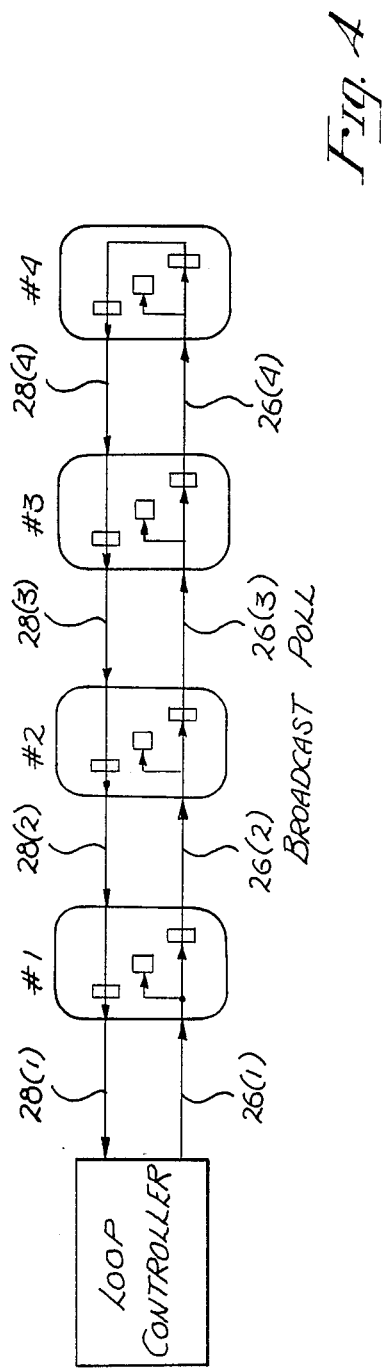
FIG. 4 is a block diagram illustrating the state of the various nodes in a network during a broadcast poll from the loop controller.

First referring to FIG. 1, a block diagram of one configuration of the local area network of the present invention may be seen. In accordance with this diagram, such a system consists of a host 20 which, by way of example, may be a microcomputer of general or special purpose, or which could be a communication port to a larger computer. Coupled to the host 20, typically through a conventional communication link such as an RS232 link, is a loop controller 22 which provides the primary control of the communication system as orchestrated by the host. Connected to the loop controller are a plurality of nodes 24(1) through 24(N). To be more specific, a line 26(1) is used for communications from the loop controller to node 24(1), with a second line 26(2) being coupled between nodes 24(1) and 24(2) to carry communications from the loop controller through the first node to the second node, etc. The lines 26 in a typical embodiment might be an inexpensive shielded twisted pair to be used for an RS422 communication link, though substantially any communication link or links may be used as desired. By way of specific example, in a security system one might choose to use a fiber optics communication link for excellent security against tampering, though in other applications one might choose to use an RF link or a microwave link for one or more of the lines 26(n). These lines are unidirectional communication links however, which as may be seen from FIG. 1, connect the loop controller to all nodes. In addition, the nodes 24(1) through 24(N) are similarly connected through unidirectional communication lines 28(N) through 28(1) back to the loop controller. Obviously the combination of unidirectional links 26(n) and 28(n) constitutes a single bidirectional link, though in recognizing that identity, it is believed better for purposes of clarity to discuss them as two unidirectional links or lines in the description to follow. Also, the words line and link are used to mean the same thing, the word line or lines generally being used for better visualization but without any intention of excluding lines which are something other than hard wired lines, such as radio frequency transmissions, microwave links, fiber optics, etc. Also of course, while the RS422 transmission protocol is preferred, it is to be noted that substantially any protocol, whether standard or specially composed for a particular application, may be used as desired or appropriate for a particular application.

Now referring to FIG. 2, a block diagram exemplary of a typical node may be seen. While this diagram is exemplary of only one of many ways of physically realizing each node, it is both simple and exemplary of the various functional capabilities thereof. The node itself is a generalized node 24(n), and therefore may be one of the nodes 24(1) or 24(N) (see FIG. 1) or any of the nodes therebetween. Each node of course includes receivers 32 and 34 for the incoming lines 26n and 28(n+1) and corresponding line drivers 36 and 38 for outgoing lines 28(n) and 26(n+1). As stated before, preferably the various lines are RS422 lines and accordingly, the drivers and receivers are RS422 drivers and receivers respectively.

Each node in this embodiment contains a microprocessor 40 containing a stored program in ROM and an adequate amount of RAM for temporary data storage, both in support of the program in ROM for its control of the node and the servicing of a local device 42 connected thereto, and as shall subsequently be seen, for the temporary storage of information received from an upstream node on line 26(n) and passing that information downstream on line 26(n+1). The microprocessor 40 may be in the form of a single chip computer such as an Intel 8051, as such single chip computers have adequate on-board ROM and RAM for many applications, but may also be a microprocessor with separate RAM and ROM, particularly if more temporary or permanent storage is desired. While communications between rhe local device 42 and the microprocessor 40 may be by way of any communication link, normally the node will be either near or built into the local device so that a direct bus connection between the microprocessor and the local device may be used. Otherwise, in general the communication to and from the microprocessor may be by way of a parallel interface, or on serial lines connected to a processor bus through an appropriate interface as desired.

As may be seen, the microprocessor is connected through line 44 to line 46 to receive any incoming signal from line 26n. Any such incoming signal on either of lines 26(n) and 28(n+1) are coupled through lines 44 and 50 to one of the inputs to electronic switches AL and BU, respectively. Coupled as a second input to the electronic switch AL is the microprocessor output on line 52, with the output of switch AL being coupled as the second input to switch BU, each of the two switches AL and BU being controllable by the microprocessor to either pass the signal received on the respective incoming line therethrough or instead, to couple the alternate signal therethrough. The outputs of switches AL and BU on lines 56 and 58 respectively, are coupled as the input to the respective one of line drivers 38 and 36. The two switches AL and BU in this embodiment are switches which select as their single output, either one of the two inputs thereto, the switches of course being controlled by the microprocessor 40 through control lines shown in phantom in FIG. 2 to better separate the signal paths from the control paths.

It may be seen from FIG. 2 that an incoming signal on line 26(n) may be passed through the receiver 32, line 44, switch AL, line 56, line driver 38 and out on line 26(n+1), while at the same time being monitored by the microprocessor through line 46. Alternatively, switch AL may be switched to couple the output of the microprocessor on line 52 to line 56 and ultimately out on line 26(n+1), with the incoming signal on line 26(n) being monitored by the microprocessor through line 46 or, as shall subsequently be seen, being temporarily stored in the processor memory for subsequent sending through line 52, etc., outward over line 26(n+1). Also, the incoming signal on line 26(n) may be coupled through switch AL and lines 56 and 60 to switch BU for looping back through line 28(n). Accordingly, the various switch settings define the momentary characteristics and communication capabilities of each node, the function of which is perhaps best illustrated by explaining typical sequences of operation of the system of FIG. 1.

Now referring to FIGS. 3a through 3d, the startup sequence for the system of FIG. 1 may be seen. In particular, on start up with power applied to the various nodes and before the loop controller takes control thereof, each node will be in the closed or loopback condition wherein a signal coming in on line 26(n) (see FIG. 2 for the generalized node and signal identification) will be looped back through switches AL and BU onto line 28(n). In this condition of course, the microprocessor in the first node can still monitor the incoming signal on line 26(n) through lines 44 and 46, and therefore can respond to a request from the loop controller. Thus at startup, the loop controller will send out a request on line 26(1) for the first node to identify itself, with the node first looping back the identification request followed by the transmission of its node identification number. Stated differently, considering the switches as if they were mechanical switches, each having an upper position coupling the upper input line to the output, and a lower position coupling the lower input line to the output, switches AL and BU are initially in the lower position to have each node in the loopback configuration, as shown in FIG. 3a. The microprocessor in the first node, being coupled to line 26(1), will detect the request for identification, and after that request has been received and directly looped back, will change switch AL to the upper position so that the processor can put its identification number out over line 28(1).

After the loop controller receives and retains the identification number for the first node in the system, the loop controller will command the first node to change switch AL to the lower position and switch BU to the upper position so that any signals received on lines 26(1) and 28(1) will be directly and immediately repeated on lines 26(2) and 28(2) respectively. This is illustrated in FIG. 3b. Now of course the second node in the system is effectively directly coupled to the loop controller so as to be able to identify and respond to a request for its identification number. Thus the sequence may be repeated until as shown in FIG. 3c, the loop controller has identified the last node in the system, and without knowing whether additional nodes have been added, unsuccessfully attempts to identify one more nonexistent node. Thereafter the loop controller will issue a specific command to the last identified node (using that node's identification number) to cause that node to change its switch BU to the lower position so that the signal coming in on line 26(n) is looped back onto line 28(n) for return toward the loop controller. While not specifically heretofore mentioned, to assure message integrity, normally a request from the controller to one or more nodes will be looped back by some node to the controller, allowing verification of message and loop integrity by the controller, with the node taking any requested action and then acknowledging completion of the request on its outgoing line 26(n+1), which acknowledgement will be looped back to the controller for verification by the controller. Alternatively, the node can acknowledge the request immediately and then proceed with the requested action, with the node indicating completion to the controller on the next broadcast pole.

The foregoing start up sequence illustrates a number of capabilities of the present invention. In particular, it will be noted that since the loop controller sequentially identifies each successive node in the loop on start up, the only requirement is that the nodes each have a unique identification number. The loop controller, creating an identification number table on startup, will note any duplications so that any inadvertent duplications can be immediately corrected. It is not required that the nodes be placed in the system in accordance with the order of their identification numbers. Further, additional nodes can be added to the system substantially at will, as all nodes, whether at either end of the system or in between, are identical, whereby the system can reconfigure itself for the additional nodes under software control. While the separation between nodes using RS422 lines can be up to approximately 4,000 feet, the entire loop length could in fact string out for miles if desired. It should be noted also with respect to FIG. 3c that it was previously stated that the loop controller identifies the last node in the string of nodes by its inability to communicate with one more node downstream. This means of course that such failure to communicate might equally well be caused by a defective node in the system and/or a broken line. Thus by going through the equivalent of the start up cycle, the loop controller can identify the location of the faulty node and/or broken line and reconfigure the system to be fully operative up to that fault or break, allowing at least partial use of the system until the repair can be effected, and specifically identifying the location of the fault or break to the node or internode transmission line level.

For purposes of example, assume the system has gone through the start up sequence of FIGS. 3a through 3d and that the system is a particularly simple system having only four nodes numbered 1 through 4 as shown in FIG. 4. As shown, the loop controller can substantially immediately communicate with any and/or all of the four nodes through lines 26, as the processors in all nodes are connected to the respective line segment of line 26 to monitor the line in what is commonly referred to as a multidrop configuration. Obviously in this configuration, the loop controller can send a node specific request to any node in the system through line 26, with the responding node changing its switch AL to the upper position and placing its response on the respective line 26(n+1), that request followed by the response being substantially immediately echoed back to the loop controller on line 28 from the last node of the system. The immediate return of the request followed by the response allows the loop controller to verify the integrity of the request as received by the responding node by noting that the integrity of the request was maintained throughout the entire loop transmission.

When in the configuration of FIG. 4, the loop controller may also send out a generalized broadcast poll requesting all nodes having a message to send to the loop controller to place their message on the respective return line segment 28(n). Normally such response or return messages will be in the form of a fixed protocol or format having a leader which is or includes the identification number of the specific node which generated that message. Normally also the generalized broadcast poll sent out on line 26(1) will be followed by a trailer or caboose no more than a few bit times after the poll which, as shall be more fully described, will be looped back to the controller after all responses or return messages are looped back to the controller. Finally, the nodes themselves are programmed so that each responding node will retain a copy of its own return message in a buffer until it receives an acknowledge and clear signal from the loop controller. This allows the loop controller to automatically retry the process upon failure to receive the original request, the return messages and the caboose all in a correct form. This, together with an overlaying of an error detection and/or correction code (CRC, Hamming code, etc.) will preserve communication integrity in the face of any reasonable transient noise or fault conditions. These aspects of the invention will become more apparent in the description to follow.

Figure 5:
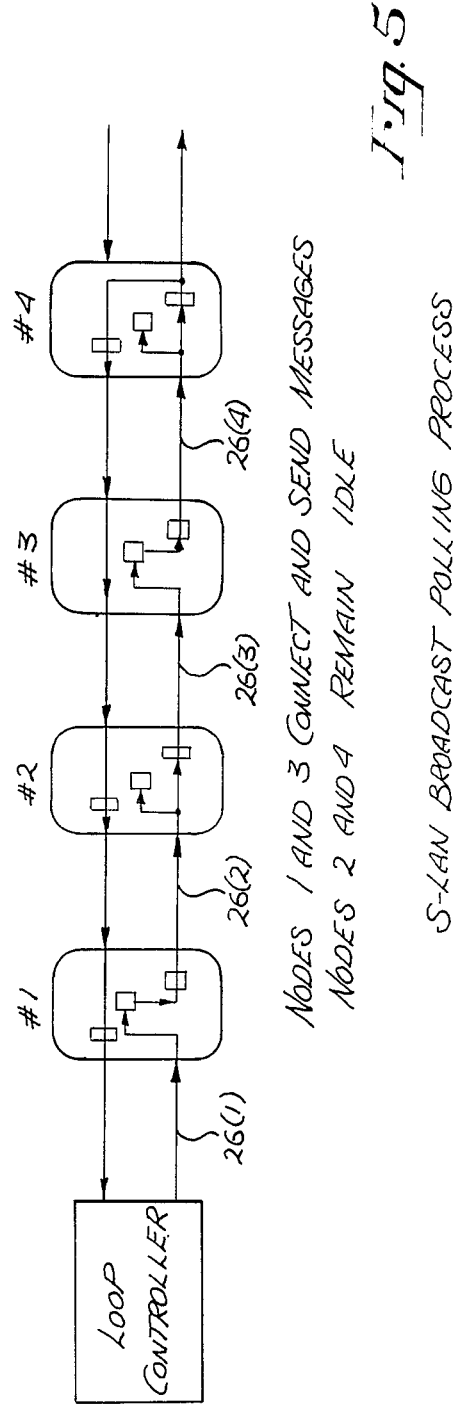
FIG. 5 is a diagram similar to FIG. 4, but illustrating the switching of the responding nodes in the network for the daisy chaining of the responding nodes.

Continuing with the example, assume node number 1 and node number 3 have a message to send in response to the poll, whereas nodes 2 and 4 do not. The nodes not having a message to send will remain in the open state as illustrated in FIG. 4, though those responding will change states as illustrated in the block diagram of FIG. 5. In particular, referring again to FIG. 2, switches BU in all nodes and switches AL in the nonresponding nodes will not change state. However, switches AL in the responding nodes will change to the upper position so that instead of the node merely repeating any signal received on line 26(n), the node will output its own signal (identification code and message) on line 52 through switch AL, etc., and out onto line 26(n+1), while at the same time receiving and temporarily storing any incoming signal in line 26(n) and line 48 to the processor, so that the responding nodes are now effectively daisy-chained together.

In general the responding nodes will immediately switch as described, to be prepared to receive and store signals from the upstream node, but each will pause shortly before outputting its own signal to be sure the other responding nodes have switched and are prepared to receive signals. Thus after receiving the poll, switching and slightly pausing, both node 1 and node 3 of FIG. 5 will simultaneously put their respective identification codes and messages on the return lines. At the same time node number 1 is temporarily storing the caboose as received from the controller, with node number 3 receiving and temporarily storing the message and identification code from node number 1 as it is sending its own message and identification code downstream. Immediately thereafter the temporarily stored message and identification code from node number 1 will be output by node number 3 on line 26(4) for transmission downstream and loopback to the controller, while at the same time node number 3 is storing the caboose being sent on line 26(2) by node number 1. Finally node number 3 will output the caboose on line 26(4) after outputting the message and identification number of node 1, so that the loop controller will receive on line 28(1) with relatively negligible delay, first its original request, followed by the messages and identification numbers of each responding node, followed by the caboose (and then followed by a verification and clear sequence if desired). Thus, no matter how large the system, any number of nodes may simultaneously respond to a generalized poll from the loop controller without requiring sequential polling of each individual node, without any line contention problem and without any transmission delays which would otherwise be caused by reserving time slots in the return transmission for nonresponding nodes.

Figure 6:
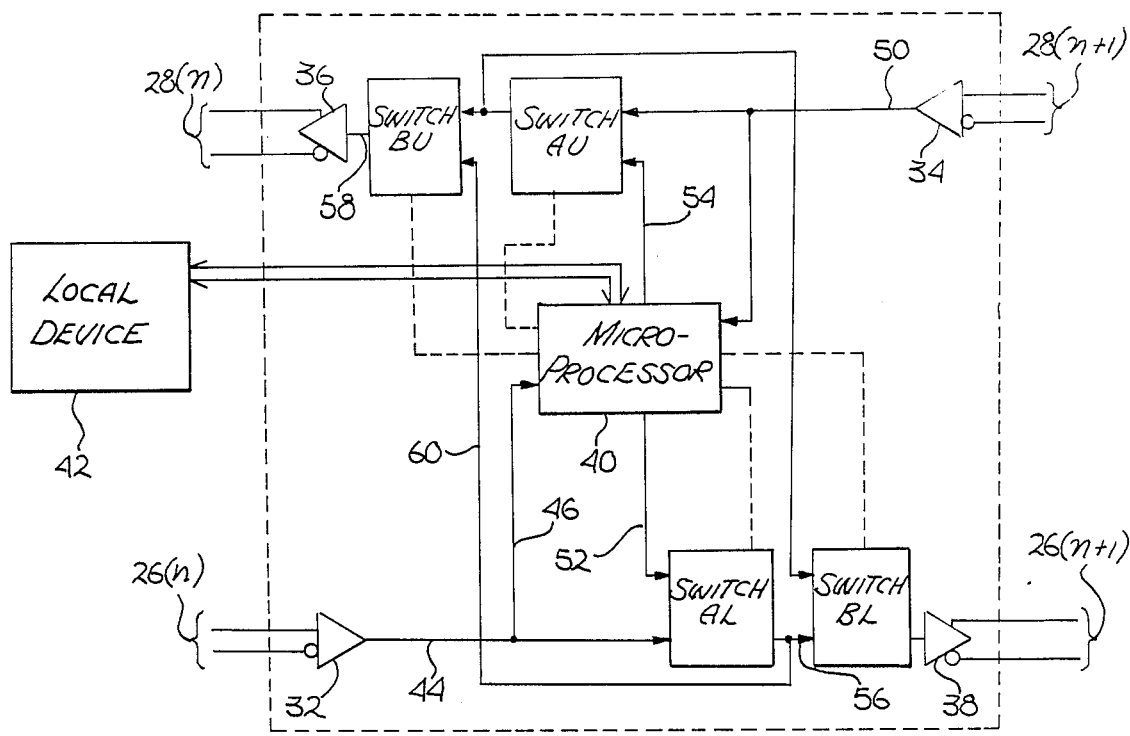
FIG. 6 is a schematic diagram of an expanded node of the present invention into a substantially symmetrical configuration.

Now referring to FIG. 6, a typical node of the present invention in a different and expanded configuration may be seen. As shown in the figure, an incoming signal on line 26(n) may be passed through the receiver 32, line 44, switch AL, line 56 and switch BL, through line driver 38 and out on line 26(n+1), while at the same time being monitored by the microprocessor through line 46. Alternatively, switch AL may be switched to couple the output of the microprocessor on line 52 to line 56 and ultimately out on line 26(n+1), with the incoming signal on line 26(n) being monitored by the microprocessor through line 46, and being temporarily stored in the processor memory for subsequent sending through line 52, etc., outward over line 26(n+1). Also, the incoming signal on line 26(n) may be coupled through switch AL and lines 56 and 60 to switch BU for looping back through line 28(n). Finally, of course, because of the symmetry of the node structure, similar routing of any signal received on line 28(n+1) and/or microprocessor output on line 54 may be achieved by appropriate control of the switches. Accordingly, the various switch settings define the momentary characteristics and communication capabilities of each node, the node of FIG. 6 being expanded over that of FIG. 2 to essentially make the node symmetrical or bidirectional in its capabilities.

Figure 7:
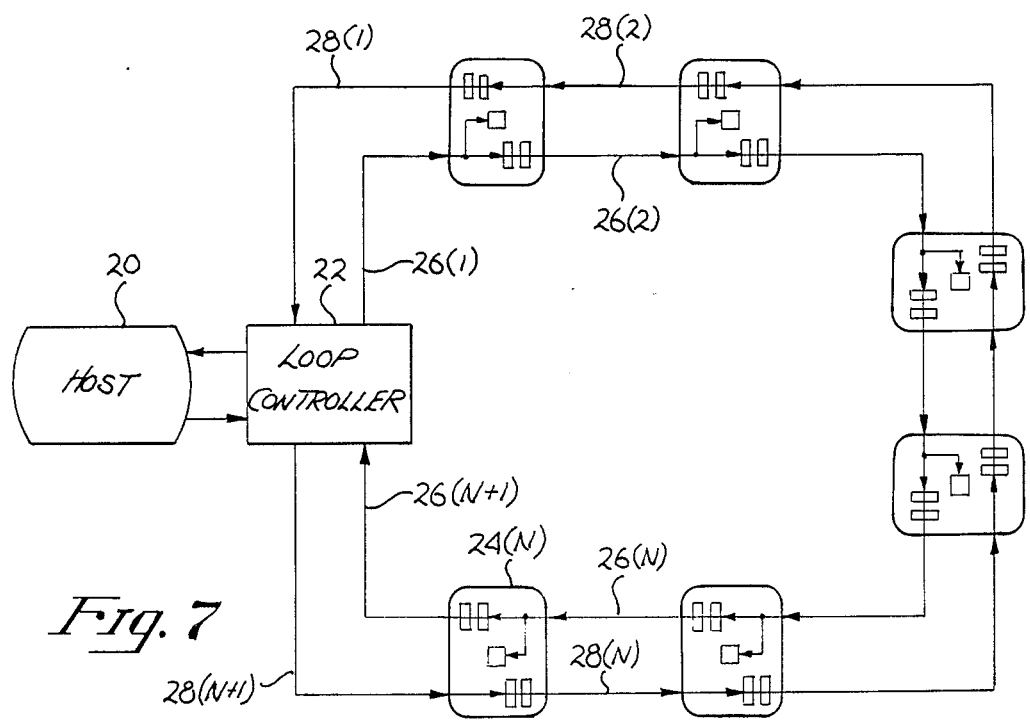
FIG. 7 is a block diagram of a redundant communication network using the node configuration of FIG. 6.

Now referring to FIG. 7, a network using the node of FIG. 6 may be seen. This configuration in essence is the same as that of FIG. 1 with the further addition that the last node 24(N) is also coupled to the loop controller through lines 26(N+1) and 28(N+1). This double loop configuration has even greater capabilities than that of FIG. 1 and has the only additional constraint that the last node 24(N) have a proximity to the loop controller within the communication distance capabilities of the lines 26(N+1) and 28(N+1).

The looping back of each of the lines 26 and 28 in this manner grossly expands the capabilities of the system in various ways. By way of example, one could communicate to the nodes from the loop controller on line 26, with the nodes responding in a counterclockwise direction on line 28. Because of the symmetry in the nodes one can also communicate from the loop controller to the nodes in a counterclockwise direction on line 28 and receive the replies from the responding nodes in a clockwise direction on line 26. However, it is preferred to use lines 26 and 28 as two complete redundant loops, either of which is adequate for full communication to and from all nodes. By way of example, a generalized poll may be transmitted on line 26(1) all the way around the loop, to be returned to the loop controller 22 on line 26(N+1) by node 24(N), rather than being looped back to the controller through line 28. After the transmission of the poll is completed (with the caboose following), each node 24(n) responding to the poll may put its message on line 26(n+1) while temporarily storing any signal from an upstream node (or the controller) coming in on line 26(n) for retransmission immediately after completing the transmission of its own message. Thus, as seen by the loop controller, the generalized poll would go out on line 26(1) and immediately be looped back through line 26(N+1), immediately followed by a series of transmissions from the responding nodes in descending order as before. With respect to the switch settings in each node to enable the node to transmit its message on the respective line segment 26, this is achieved by switching switch AL to the upper position and switch BL to the lower position so as to connect the output of the microprocessor of the particular node through the line segment 26(n+1) while at the same time the microprocessor monitors and temporarily stores any incoming message on line 26(n) through line 46 for immediate retransmission through line 52, etc., out over line 26(n+1). Again because of the symmetry of the nodes, the second loop 28 will similarly provide full communication capabilities to and from all nodes s that the configuration of FIG. 7 has full communication redundancy.

As a result of the foregoing, the lines of either loop may have any number of breaks or shorts therein without disrupting any of the communication capabilities of the other redundant loop. Also, one can quickly identify the presence of a break by periodically alternating between communication links 26 and 28, and when one loop is found inoperative, using the other until time will allow going through a start up sequence through the line having the break, wherein the first node past the break will fail to identify itself in response to the request from the loop controller. Note that the startup sequence for the system of FIG. 7 is the same as that of the system of FIG. 1, though because of the symmetry of the nodes, the start up sequence of the system of FIG. 7 may be by way of a clockwise or counterclockwise progression of nodes, or both, by merely effectively reversing the roles of lines 26 and 28 for the start sequences.

Figure 8:
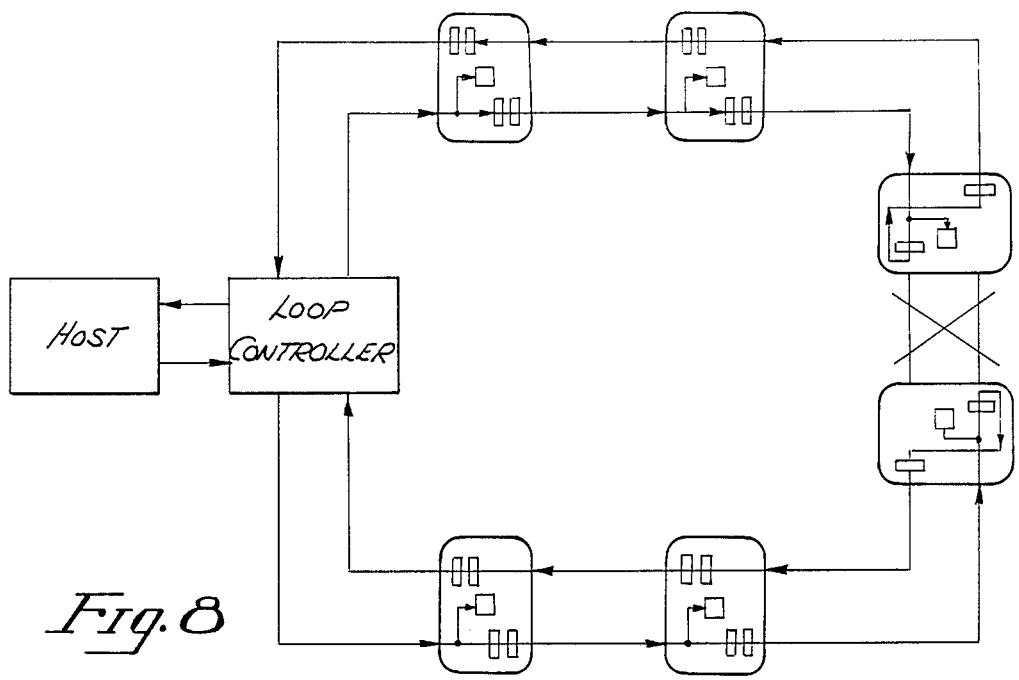
FIG. 8 is a block diagram similar to FIG. 7, but illustrating the manner in which two nodes may be switched to break the redundant loop into two fully operative loop segments to maintain communication in the face of communication lines between two nodes.

If both lines between two nodes are broken as illustrated in FIG. 8 the system can proceed through the start up sequence on each of the two loop segments, basically reconfiguring itself into two smaller loops, each of which functions generally as described with respect to FIG. 1, with the last node at each segment being the last node in that segment prior to the break. As a result, the line segments in which the breaks have occurred have been determined and the system returned to fully operative capabilities before any repair effort is made on the actual breaks themselves.

Figure 9:
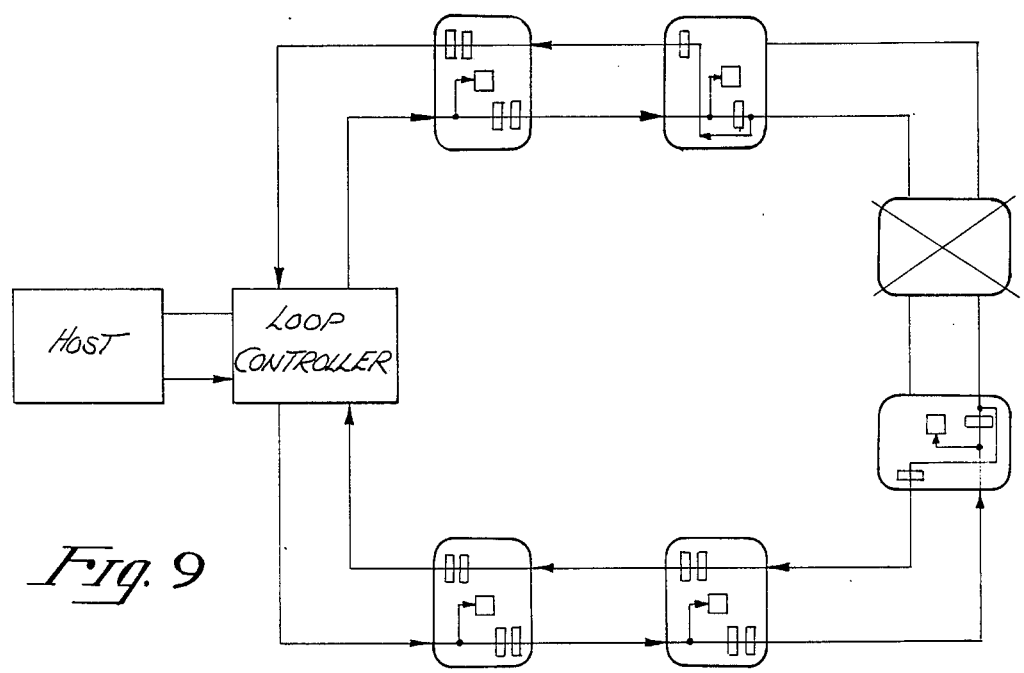
FIG. 9 is a block diagram similar to FIG. 7, but illustrating the switching of two nodes so as to convert the redundant loop into two operative loop segments to cut out a nonoperative node therebetween.

Upon the occurrence of a node failure as illustrated in FIG. 9 the redundant double loop system may also go through the start up sequence for each of the two loop segments, this time establishing two fully operative smaller loops, cutting out only the faulty node. In that regard, such a node failure is in essence a catastrophic failure such as caused by a power loss or processor failure holding the switches in the node in useless switch settings. Other possible failures in or associated with the node, such as failure of the local device, may render the node effectively inoperative for the intended purpose, yet still allow the node to act as a repeater for the signals coming thereto so as to maintain the loop or loops therethrough. In that regard, the controller can periodically query individual nodes for error checking purposes to be sure each node remains ready to perform as desired. Similarly failure of one of the line drivers 36 and 38, one of the receivers 34 and 32 or one of the switches may well still allow the system to be fully operative on the other loop.

Figure 10:
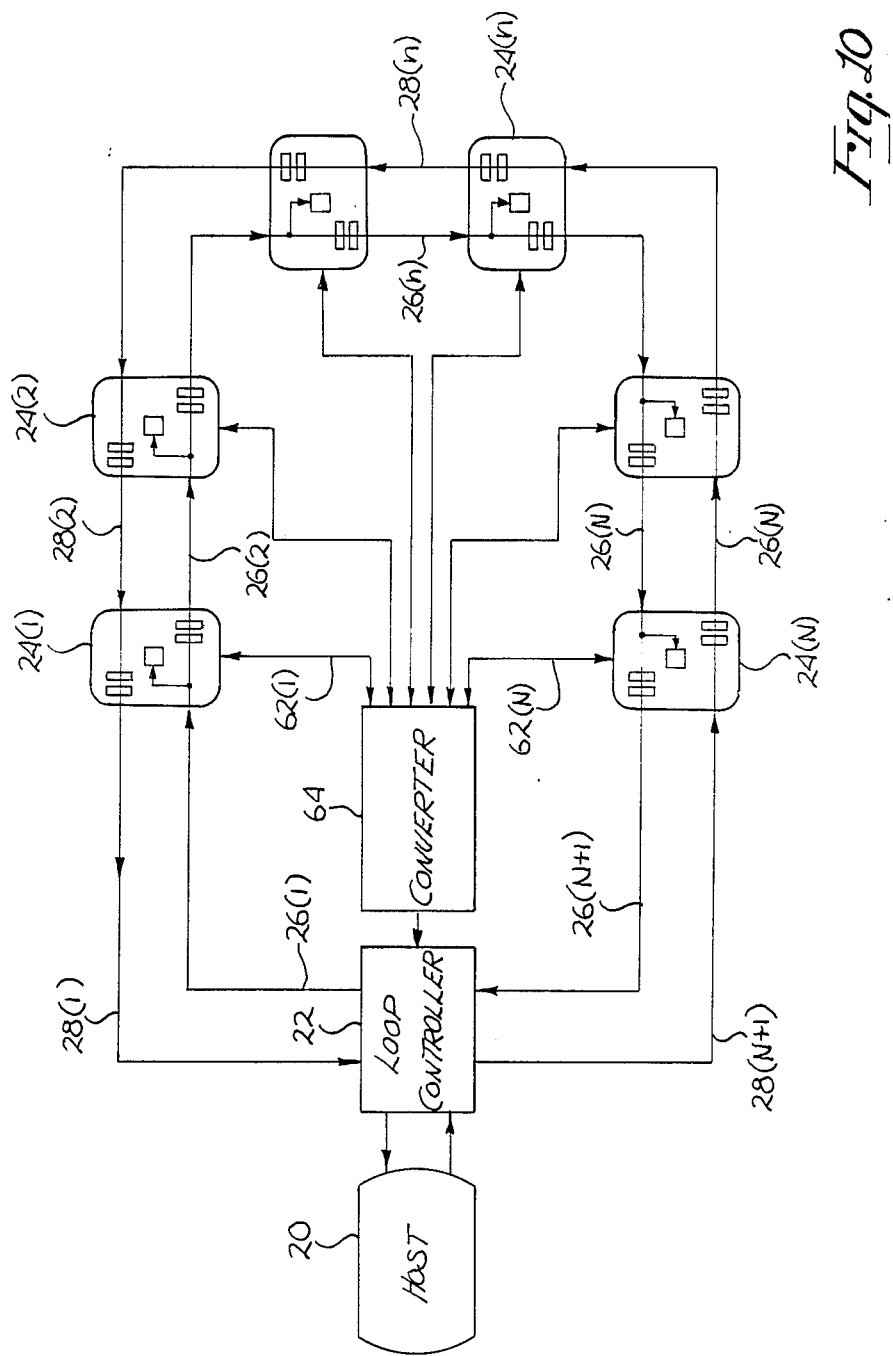
FIG. 10 is a block diagram similar to FIG. 7, but illustrating the addition of a third communication link between the loop controller and each of the nodes to provide a tridundant communication capability in the network.

Finally, a tridundant embodiment of the present invention providing a third level of redundancy may be seen in FIG. 10. In this embodiment not only is the double loop configuration utilized, but in addition, independent low speed lines 62(n) each extend between the loop controller and a respective node to provide ultimate low speed backup for the system. By way of example, each of the lines 62(n) might be a current loop transmission line similar to wire-based long distance telephone systems. These lines are in general incapable of communicating with the nodes at the same rates as on the primary RS422 lines, but can be driven at lower rates such as, by way of example, 300 or 1200 BAUD, adequate for security purposes and/or a reduced performance system until the high speed loops can be brought back on line. In general, due to the low transmission rates required of these links, various technologies are available which can allow direct communication with even the most remote node. The tridundant communication capability, being a feature of an alternate embodiment or option, could either be built into the loop controller or accomplished using an intelligent converter 64 coupled to an additional port on the controller so that the major component of the tridundant system may be added after the fact if experience shows the need therefor.

There has been disclosed and described herein a new and unique local area network which may be configured and automatically reconfigured in various ways, using a standard node construction, for high speed communication, and which has many additional features such as fault detection and fault tolerant operation, redundancy, etc. While the system could be programmed to allow node to node communication, preferred embodiments contemplate communications between individual nodes and the loop controller, with any required node to node communication being in the form of first node to loop controller communication followed by loop controller to second node communication. The system in effect combines the best attributes of multidrop and daisy chain systems in that the modes of operation analogous to the multidrop system provides for high speed communication with all nodes, whereas the daisy chain communication from nodes to loop controller as implemented in the present invention avoids the need for individual polling with its associated waste of time on nonresponding nodes, or for time slotting and its waste of unused time slots, while at the same time allowing all responding nodes to effectively transmit at the same time (but asynchronously) without any line contention problems or arbitration or priority schemes required. Obviously while FIGS. 2 and 7 suggest a specific node arrangement and switch configuration, various different switching arrangements and interconnection of the elements within the node may readily be incorporated to achieve the basic functions described herein. Also, while the preferred embodiment contemplates the use of the loop controller 22 in conjunction with the host computer 20 to relieve the host computer of the normal system overhead requirements, particularly when the host computer is simultaneously used for other purposes, the loop controller could just as well be a controller card in a microcomputer dedicated entirely to the operation of the system, or the host could be a special function processor board to implement a stand alone capability such as a security system.

It should be noted that heretofore the specific nature of the local device has not been specified, though it should be clear from the disclosure herein that the local device may be substantially anything. By way of example, the local device might be an RS232 compatible device such as a printer, a terminal, a modem or the like, or for that matter, in some applications could be another microcomputer. One particular application for which the present invention is well suited is in security systems wherein the local device might be a card reader, keypad, door lock, intrusion sensing device, fire detection device, monitoring device, control device, or any combinations of such devices, as the system of the present invention is as well suited for merely monitoring remote sensors or devices as it is for responding to the needs of and/or controlling of the various remote local devices. Thus while the present invention has been disclosed and described herein with reference to certain preferred embodiments thereof, it will be understood by those skilled in the art that various changes in form and detail may be made therein without departing from the spirit and scope of the invention.

We claim:

1. A local area network comprising
  a loop controller having a loop controller input and a loop controller output;
  a plurality of nodes each having a first node input and a first node output, and a second node input and a second node output;
  the first node having its first node input coupled to said loop controller output and its second node output coupled to said loop controller input, each successive node having its first node input coupled to the first node output of the preceeding node and its second node output coupled to the second node input of the preceeding node, whereby said nodes are coupled in the network in an ascending order on a first unidirectional communication link and in a descending order on a second unidirectional communication link,
  each of said nodes having control means having a control means input and a control means output, said control means input being coupled to the respective said first node input, said control means having temporary storage means associated therewith,
  each of said nodes also having switching means for
    (a) connecting said first node input thereof to said first node output thereof
    (b) connecting said second node input thereof to said second node output thereof
    (c) connecting said control means output to at least one of said first and second node outputs thereof
    (d) connecting said first node input thereof to said second node output thereof
  whereby all nodes may be controllably connected to the loop controller on the first communication link in a multidrop configuration to all receive a message from the loop controller substantially simultaneously, with responding nodes switching to a daisy chain configuration to receive and temporarily retain incoming messages on the first communication link while outputting its own message or any previously received and temporarily retained message on the first communication link, the last node in the series of nodes being switched to loop messages received on the first communication link back on the second communication link for direct communication to the loop controller.

2. The local area network of claim 1 wherein said control means is also coupled to a local device for communication therewith, whereby said loop controller may request and receive messages on said local area network originating from said local device.

3. The local area network of claim 1 wherein each of said nodes is preassigned a unique identification number, whereby each node may identify itself uniquely to the loop controller upon request.

4. The local area network of claim 3 wherein each of said nodes on startup switches so that said first node input is connected to said second node output thereof, said loop controller being a means for sequentially requesting a node to identify itself, and upon receipt of the identification, causing the identifying node to switch so that its first node input is connected to its first node output and its second node input is connected to its second node output, whereby the identification sequence will be repeated until all nodes have identified themselves to the loop controller.

5. The local area network of claim 4 wherein said loop controller includes means for detecting the lack of response from one additional node, existent or not, and for causing the preceeding node to switch so that said first node input thereof is connected to said second node output thereof.

6. The local area network of claim 1 wherein each node includes a receiver on each of said first and second node inputs thereof and a line driver on each of said first and second node outputs thereof, whereby any node will act as a signal repeater for a message received on either communication link if said switching means therein is connecting the respective node input and node output for that communication link.

7. The local area network of claim 1 wherein said loop controller is a means for sending a message constituting a broadcast poll on said first communication link, followed by another message constituting a trailer,
  whereby all nodes will be connected to the loop controller on the first communication link in a multidrop configuration to all receive the broadcast poll message from the loop controller substantially simultaneously, with responding nodes switching to a daisy chain configuration to receive and temporarily retain incoming messages on the first communication link while outputting its own message or any previously received and temporarily retained message on the first communication link, the last node in the series of nodes being switched to loop messages received on the first communication link back on the second communication link for direct communication to the loop controller, the loop controller thereby receiving on the second communication link its own broadcast poll, followed by the messages from the responding nodes in sequence, followed by its own trailer message.

8. The local area network of claim 7 wherein the messages from each responding node includes the identification of the node.

9. A node for use in a local area network, said node having a first node input and a first node output, and a second node input and a second node output, said node having control means having a control means input and a control means output, said control means input being coupled to said first node input, said control means having temporary storage means associated therewith for temporarily retaining any messages received on said first node input when said control means output is connected to either of said first and second node ouputs, and for outputting the messages after outputting its own messages and any previously temporarily retained message, said node also having switching means for
  (a) connecting said first node input thereof to said first node output thereof
  (b) connecting said second node input thereof to said second node output thereof
  (c) connecting said control means output to at least one of said first and second node outputs thereof
  (d) connecting said first node input thereof to said second node output thereof.

10. The node of claim 9 wherein said control means includes means for coupling to a local device for communication therewith.

11. The node of claim 9 wherein said node includes means for providing a node identification number.

12. The node of claim 9 wherein said node on startup switches so that said first node input is connected to said second node output thereof.

13. The node of claim 9 wherein said node includes a receiver on each of said first and second node inputs thereof and a line driver on each of said first and second node outputs thereof, whereby the node will act as a signal repeater for a message received on either node input if said switching means therein is connecting the respective node input and node output.

14. A method of communication by a loop controller with a plurality of nodes comprising the steps of
  (a) connecting the nodes and loop controller in series in a first unidirectional communication link with the loop controller at the originating end of the first communication link,
  (b) connecting the nodes and loop controller in series in a second unidirectional communication link in reverse order from that of step (a) whereby the loop controller is at the terminating end of the second communication link,
  (c) causing the node most remote to the loop controller to couple the first communication link back onto said second communication link,
  (d) causing each of the other nodes to directly couple the first communication link therethrough and the second communication link therethrough, whereby each node may monitor a message from the loop controller on the first communication link in a multidrop configuration,
  (e) causing nodes responding to a message from the loop controller to interrupt the first communication link to temporarily store messages received thereby on the first communication link while sending its own message or previously stored messages of other nodes, and thereafter to send any such temporarily stored message on the first communication link.

15. A local area network comprising
a loop controller having first and second loop controller inputs and first and second loop controller outputs;
a plurality of nodes each having a first node input and a first node output, and a second node input and a second node output;
the first node having its first node input coupled to said first loop controller output and its second node output coupled to said second loop controller input, each successive node having its first node input coupled to the first node output of the preceeding node and its second node output coupled to the second node input of the preceeding node, the last of said plurality of nodes also having its first node output coupled to said first loop controller input and its second node input coupled to said second loop controller output, whereby said nodes are coupled with said loop controller in the network in an ascending order on a first unidirectional communication loop and in a descending order on a second unidirectional communication loop,
each of said nodes having control means having a control means input and a control means output, said control means input being coupled to said first and second node inputs, said control means having temporary storage means associated therewith,
each of said nodes also having switching means for
  (a) connecting said first node input thereof to said first node output thereof
  (b) connecting said second node input thereof to said second node output thereof
  (c) connecting said control means output to said first and second node outputs thereof
whereby all nodes may be controllably connected to the loop controller in either communication loop in a multidrop configuration to all receive message from the loop controller substantially simultaneously, with responding nodes switching to a daisy chain configuration to receive and temporarily retain incoming messages on the respective communication loop while outputting its own message or any previously received and temporarily retained message on the respective communication loop.

16. The local area network of claim 15 wherein said control means is also coupled to a local device for communication therewith, whereby said loop controller may request and receive messages on said local area network originating from said local device.

17. The local area network of claim 15 wherein each of said nodes is preassigned a unique identification number, whereby each node may identify itself uniquely to the loop controller upon request.

18. The local area network of claim 15 wherein each node includes a receiver on each of said first and second node inputs thereof and a line driver on each of said first and second node outputs thereof, whereby any node will act as a signal repeater for a message received on either communication loop if said switching means therein is connecting the respective node input and node output for that communication loop.

19. The local area network of claim 15 wherein said loop controller is a means for sending a message on one of its first and second loop controller outputs constituting a broadcast poll, followed by another message constituting a trailer, whereby all nodes will be connected to the loop controller on the respective communication loop in a multidrop configuration to all receive the broadcast poll message from the loop controller substantially simultaneously, with responding nodes switching to a daisy chain configuration to receive and temporarily retain incoming messages on the respective communication loop while outputting its own message or any previously received and temporarily retained message on the respective communication loop, the loop controller thereby receiving on its input for the respective communication loop its own broadcast poll, followed by the messages from the responding nodes in sequence, followed by its own trailer message.

20. The local area network of claim 19 wherein the messages from each responding node includes the identification of the node.

21. The local area network of claim 15 wherein the switching means in each node is also a means for
    (d) connecting said first node input to said second node output thereof
    (e) connecting said second node input to said first node output
whereby any node may be switched to loop messages received on either communication loop segment back on the other communication loop segment for communication thereon to the loop controller.

22. The local area network of claim 21 wherein each of said nodes is preassigned a unique identification number, whereby each node may identify itself uniquely to the loop controller upon request.

23. The local area network of claim 22 wherein each of said nodes on startup switches so that said first node input is connected to said second node output thereof, and said second node input is connected to said first node output thereof, said loop controller being a means for providing a message on either of said first and second loop controller outputs sequentially requesting a node to identify itself, and upon receipt of the identification on the opposite loop controller input, causing the identifying node to switch so that its first node input is connected to its first node output and its second node input is connected to its second node output, whereby the identification sequence will be repeated until all nodes capable of responding have identified themselves to the loop controller.

24. The local area network of claim 23 wherein, when a node is requested to identify itself by a request provided on either said first or said second loop controller outputs, said loop controller includes means for detecting the lack of response from the node, and for causing the preceeding node to switch so that the respective node input thereof is connected to the alternate node output thereof, thereby breaking said first and second communication loops at said node, with the node looping one communication loop segment back to the loop controller on the other loop segment.

25. The local area network of claim 15 further comprised of a low speed bidirectional communication link between each node and the loop controller.

26. A node for use in a local area network, said node having a first node input and a first node ouput, and a second node input and a second note output, said node having control means having a control means input and a control means ouput, said control means input being coupled to the said first and second node inputs, said control means having temporary storage means associated therewith for temporarily retaining any messages received on either said first or said second node inputs when said control means output is connected to either of said first and second node outputs, and for outputting the messages after outputting its own message and any previously temporarily retained message, said node also having switching means for
    (a) connecting said first node input thereof to said first node output thereof
    (b) connecting said second node input thereof to said second node output thereof
    (c) connecting said control means output to said first and second node ouputs thereof
    (d) connecting said first node input to said second node output thereof
    (e) connecting said second node input to said first node output.

27. The node of claim 26 wherein said control means includes means for coupling to a local device for communication therewith.

28. The node of claim 26 wherein said node includes means for providing a node identification number.

29. The node of claim 26 wherein said node on startup switches so that said first node input is connected to said second node output thereof, and said second node input is connected to said first node output thereof.

30. The node of claim 26 wherein said node includes a receiver on each of said first and second node inputs thereof and a line driver on each of said first and second node outputs thereof, whereby the node will act as a signal repeater for a message received on either node input if said switching means therein is connecting the respective node input and node output.

31. A method of communication by a loop controller with a plurality of nodes comprising the steps of
    (a) connecting the nodes and loop controller in series in a first unidirectional communication loop,
    (b) connecting the nodes and loop controller in series in a second unidirectional communication link in reverse order from that of step (a), whereby said second unidirectional communication loop is in a direction opposite said first unidirectional communication loop,
    (c) causing each of the nodes to directly couple the first communication loop therethrough and the second communication loop therethrough, whereby each node may monitor a message from the loop controller on either communication loop in a multidrop configuration,
    (d) causing nodes responding to a message from the loop controller on either communication loop to interrupt the respective communication loop to temporarily store messages received thereby while sending its own message or previously stored messages of other nodes in the respective communication loop, and thereafter to send any such temporarily stored message on the respective communication loop.

32. The method of claim 31 wherein, as a startup sequence, each of the nodes on startup are switched so that the input thereto on each of the two communication loops is looped back as an output onto the other communication loop, the loop controller providing a message on either of the first and second communication loops sequentially requesting a node to identify itself, and upon receipt of the node identification on the other communication loop, causing the identifying node to switch to directly couple each communication therethrough, whereby the identification sequence may be repeated until all nodes capable of responding have identified themselves to the loop controller.

33. The method of claim 32 wherein, when a node is requested to identify itself to the loop controller by a request on either communication loop, the loop controller detects a lack of response from a node, and causes the preceeding node to switch so that the respecting node loops the respective communication loop segment back to the loop controller on the other loop segment.

* * * * *